US012771735B2

(12) United States Patent
Ashfield et al.

(10) Patent No.: US 12,771,735 B2
(45) Date of Patent: Oct. 20, 2026

(54) COMPUTER-BASED SYSTEMS CONFIGURED TO DYNAMICALLY GENERATE AUTHENTICATION STEPS TO PERFORM AN AMELIORATIVE ACTION AND METHODS OF USE THEREOF

(71) Applicant: Capital One Services, LLC, McLean, VA (US)

(72) Inventors: James Ashfield, Midlothian, VA (US); Donald L. Smith, Ashland, VA (US); Daniel Alan Jarvis, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 203 days.

(21) Appl. No.: 18/521,380

(22) Filed: Nov. 28, 2023

(65) Prior Publication Data

US 2025/0175508 A1 May 29, 2025

(51) Int. Cl.
*H04L 65/1076* (2022.01)
*H04L 9/40* (2022.01)
*H04W 12/63* (2021.01)

(52) U.S. Cl.
CPC .......... *H04L 65/1079* (2013.01); *H04L 63/20* (2013.01); *H04W 12/63* (2021.01)

(58) Field of Classification Search
CPC ..... H04L 65/1079; H04L 63/20; H04W 12/63
See application file for complete search history.

(56) References Cited

U.S. PATENT DOCUMENTS

| | | | | |
|---|---|---|---|---|
| 11,797,657 | B1 * | 10/2023 | Hawes | G06F 21/316 |
| 12,021,888 | B1 * | 6/2024 | Reed | G06F 16/9024 |
| 2018/0034859 | A1 * | 2/2018 | Aronowitz | H04L 63/08 |
| 2018/0232837 | A1 * | 8/2018 | Dill | G06Q 30/0201 |
| 2020/0077892 | A1 * | 3/2020 | Tran | A43B 3/42 |

OTHER PUBLICATIONS

Google translation of CN113011973B as CNâ73B published Aug. 29, 2023, 9 pages (Year: 2023).*

* cited by examiner

*Primary Examiner* — Oleg Korsak
(74) *Attorney, Agent, or Firm* — GREENBERG TRAURIG, LLP

(57) ABSTRACT

In some embodiments, the present disclosure provides an exemplary method that may include steps of receiving input data from at least two external data sources; utilizing a trained machine learning algorithm to identify a digital signal within the input data; automatically verifying the identity of the digital signal based on a repository of telecommunication data associated with the particular interaction parameter; utilizing an initiation protocol-specific backbone engine to determine that the digital signal fails to match the repository of telecommunication data associated with the particular interaction parameter; updating the repository of telecommunication data; utilizing the trained machine learning algorithm to calculate a confidence score associated with a risk factor; aggregating each confidence score to calculate an overall confidence score associated with the digital signal; dynamically generating an authentication step to be performed by the particular user; and automatically blocking an initiation to an interaction session associated with the digital signal.

11 Claims, 7 Drawing Sheets

COMPUTER-BASED SYSTEMS CONFIGURED TO DYNAMICALLY GENERATE AUTHENTICATION STEPS TO PERFORM AN AMELIORATIVE ACTION AND METHODS OF USE THEREOF

FIELD OF TECHNOLOGY

The present disclosure generally relates to computer-based systems configured to dynamically generate authentication steps of perform an ameliorative action and methods of use thereof.

BACKGROUND OF TECHNOLOGY

Typically, spam is directed to large numbers of users for the purposes of advertising, phishing, or spreading malware. Usually, spam includes all forms of unwanted communications including, but not limited to unsolicited calls or messages, caller identification spoofing, and robocalls. The goal or purpose of a spam call is to sell some goods that might be unsolicited or unwanted.

SUMMARY OF DESCRIBED SUBJECT MATTER

In some embodiments, the present disclosure provides an exemplary technically improved computer-based method that includes at least the following steps: obtaining, by at least one processor, a permission from a particular user to monitor a plurality of activities executed within the mobile device; continually monitoring, by the at least one processor, the plurality of activities executed within the mobile device for a predetermined period of time; receiving, by the at least one processor, input data from at least two external data sources of a plurality of external data sources, wherein the external data source is a mobile network operator; utilizing, by the at least one processor, a trained machine learning algorithm to identify at least one digital signal within the input data, wherein the at least one digital signal is associated with a particular interaction parameter associated with the particular user; automatically verifying, by the at least one processor, the identity of the at least one data signal based on a comparison to a repository of telecommunication data associated with the particular interaction parameter, wherein the repository of telecommunication data is generated by a plurality of data servers compiling information; utilizing, by the at least one processor, an initiation protocol-specific backbone engine to determine that the at least one data signal fails to match the comparison of the repository of telecommunication data associated with the particular interaction parameter; automatically updating, by the at least one processor, the repository of telecommunication data associated with the particular interaction parameter with a failure to match associated with the at least one digital signal; utilizing, by the at least one processor, the trained machine learning algorithm to calculate at least one confidence score associated with at least one factor of risk of a plurality of factors of risk, wherein the at least one factor of risk is associated with the at least one external data source; dynamically aggregating, by the at least one processor, each confidence score to calculate an overall confidence score associated with the at least one digital signal; dynamically generating, by the at least one processor, at least one authentication step to be performed by the particular user requesting a high-risk activity associated with the at least one digital signal based on the overall confidence score meeting or exceeding a predetermined threshold of risk; transmitting, by the at least one processor, via at least one graphical user interface (GUI) having at least one GUI programmable element within a computing device a request for at least one unique identifier associated with the particular user, wherein the request for the at least one unique identifier is at least one authentication step; and automatically blocking, by the at least one processor, an initiation to an interaction session associated with the at least one digital signal in response to a failure by the particular user to complete the at least one authentication step.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
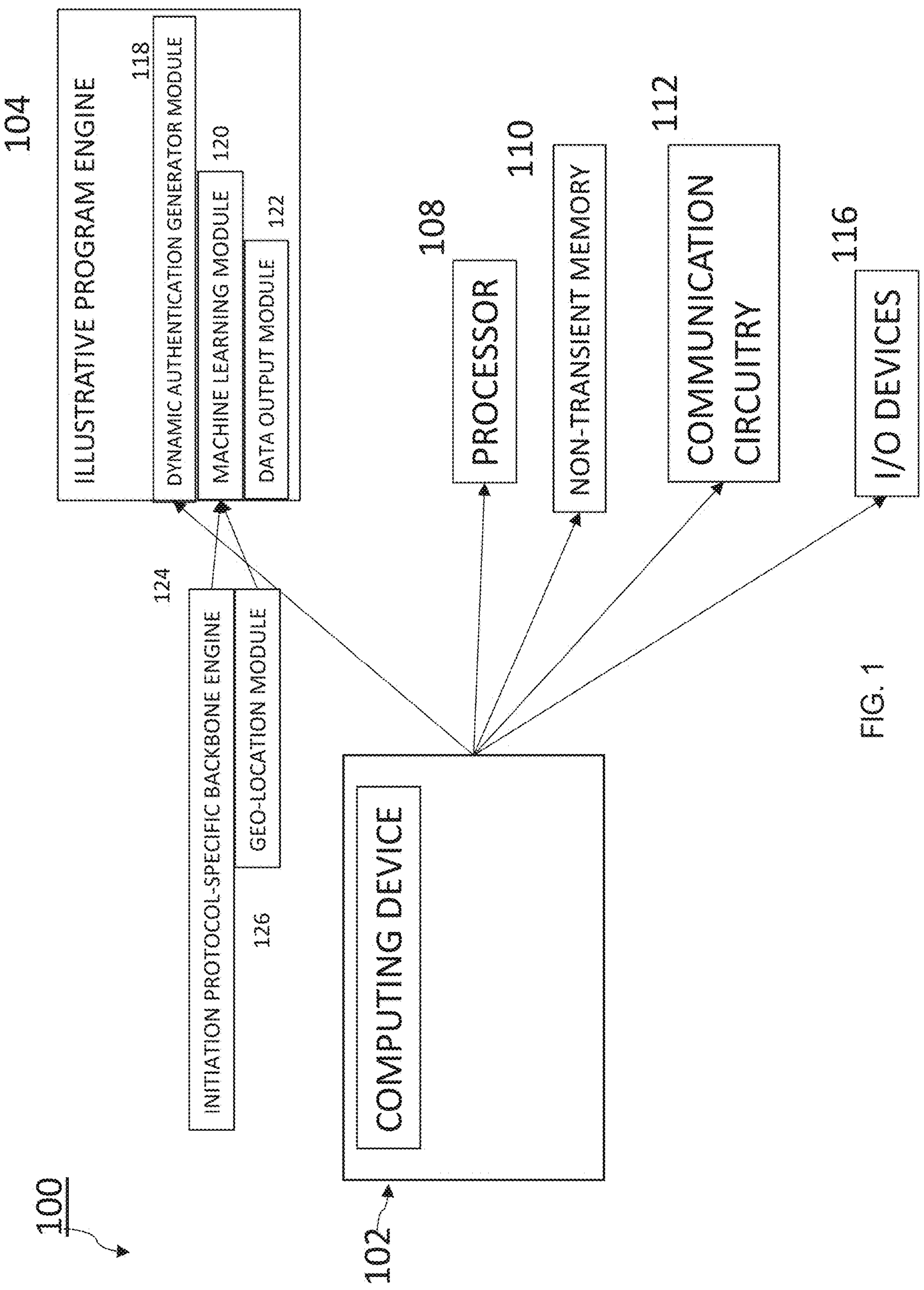
FIG. 1 depicts a block diagram of an exemplary computer-based system and platform for dynamically generating at least one authentication step to perform an activity associated with a digital signal based on an overall confidence score meeting or exceeding a predetermined threshold of risk, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

Embodiments of the present disclosure recognize a technological computer-centered problem associated with allowing a performance of an activity a technological computer-centered problem associated with authenticating a mobile device to execute a high-risk activity. An illustrative technological computer-centered problem associated with authenticating the mobile device typically arises during an unsuspected incoming interaction or activity with the mobile device, either via a telephone call, text message, or email notification, which may increase the likelihood that the information associated with an individual associated with the mobile device may be extracted while the individual is executing the high-risk activity. The illustrative technological computer-centered problem increases the risk of security breaches associated with an incoming interaction session. As detailed in at least some embodiments herein, one technological computer-centered solution associated with the technological computer-centered problem is a dynamic generation of at least one authentication step for an activity of computing device based on a calculated confidence score associated with a digital signal. In some embodiments, the present disclosure may utilize a trained machine learning algorithm to calculate at least one confidence score associated with a factor of risk and aggregate each confidence score associated with each factor of risk to calculate an overall confidence score associated with the at least one digital signal. In one embodiment, the trained machine learning module may refer to a machine learning algorithm trained using a supervised learning system for a predetermined period of time. In other embodiments, the trained machine learning module may refer to the machine learning algorithm trained using an unsupervised learning and/or a semi-supervised learning for the predetermined period of time. For example, the machine learning module may include at least one of regression algorithm, instance-based algorithm, regularization algorithm, decision tree algorithm, Bayesian algorithm, clustering algorithm, associated rule learning algorithm, deep learning algorithm, dimensionality reduction algorithm, ensemble algorithm, and/or artificial neural network algorithm. In another embodiment, the technological computer-centered solution associated with the illustrative technological computer-centered problem may refer to automatically blocking an initiation of an interaction session associated with the digital signal in response to a failure of the individual to complete the generated authentication step.

FIG. 1 depicts a block diagram of an exemplary computer-based system and platform for dynamically generating at least one authentication step to perform an activity associated with a digital signal based on an overall confidence score meeting or exceeding a predetermined threshold of risk.

In some embodiments, an illustrative computing system 100 of the present disclosure may include a computing device 102 associated with at least one user and an illustrative program engine 104. In some embodiments, the illustrative program engine 104 may be stored on the computing device 102. In some embodiments, the illustrative program engine 104 may be stored on the computing device 102, which may include a processor 108, a non-transient memory 110, a communication circuitry 112 for communicating over a communication network 114 (not shown), and input and/or output (I/O) devices 116 such as a keyboard, mouse, a touchscreen, and/or a display, for example. In some embodiments, the computing device 102 may refer to at least one calling-enabled computing device of a plurality of calling-enabled computing devices. For example, the computing device 102 is a mobile device, a smart phone, and/or a laptop. In some instances, the computing device 102 may be the at least one calling-enabled computing device with an ability to execute a plurality of activities. In some instances, at least one activity of the plurality of activities may refer to an ability to initiate an interaction session with an external computing device. In other embodiments, the at least one activity of the plurality of activities may operate discreetly during the execution of at least one other activity of the plurality of activities. For example, the at least one activity operates in the background of the computing device 102. In some embodiments, the server computing device 106 may refer to a call center server system.

In some embodiments, the illustrative program engine 104 may be configured to instruct the processor 108 to execute one or more software modules such as, without limitation, an exemplary dynamic authentication generator module 118, a machine-learning module 120, and/or a data output module 122.

In some embodiments, an exemplary dynamic authentication generator module 118 of the present disclosure, utilizes at least one machine learning algorithm, described herein, to determine at least one digital signal fails to match a comparison of a repository of telecommunication data associated with a particular interaction parameter; generate at least one authentication step to be performed by a particular user requesting a high-risk activity associated with the at least one digital signal based on an overall confidence score meeting and/or exceeding a predetermined threshold of risk; and automatically blocking an initiation to an interaction session associated with the at least one digital signal. In some embodiments, the exemplary dynamic authentication generator module 118 may receive input data from at least two external data sources. In some embodiments, the input data may refer to telecommunication data associated with a computing device 102 within a plurality of computing devices. For example, the telecommunication data may refer to cell phone number; years of ownership associated with the cell phone number; and general location of the smart phone tied with the cell phone number. In another embodiment, the external data source may refer the server computing device 106. For example, the external data source may refer to at least one mobile network operator. In some embodiments, the exemplary dynamic authentication generator module 118 may utilize the machine learning module 120 to identify at least one data signal within the input data. In other embodiments, the at least one data signal within the input data may refer to a particular interaction parameter associated with a particular user. For example, the at least one data signal may refer to incoming/outgoing phone call, facetime, and/or text message associated with the identified cell phone number of the user. In some embodiments, the exemplary dynamic authentication generator module 118 may automatically verify the identity of the at least one data signal based on a comparison to a repository of telecommunication data associated with a particular interaction parameter of the input data. In some embodiments, the repository of telecommunication data may be generated by a plurality of data servers compiling information for a predetermined period of time. In some embodiments, the exemplary dynamic authentication generator module 118 may utilize an initiation protocol-specific backbone engine 124 to determine the at least one data signal fails to match the comparison of the repository of telecommunication data associated with the particular interaction parameter. In some embodiments, the exemplary dynamic authentication generator module 118 may automatically update the repository of telecommunication data associated with the particular interaction parameter with a failure to match associated with the at least one digital signal. In some embodiments, the exemplary dynamic authentication generator module 118 may calculate at least one confidence score associated with at least one risk factor of a plurality of risk factors. In some embodiments, the exemplary dynamic authentication generator module 118 may dynamically aggregate each confidence score to calculate an overall confidence score associated with the at least one digital signal. In some embodiments, the exemplary dynamic authentication generator module 118 may dynamically generate at least one authentication step to be performed by the particular user requesting a high-risk activity associated with the at least one digital signal based on the overall confidence score meeting and/or exceeding a predetermined threshold of risk. In some embodiments, the exemplary dynamic authentication generator module 118 may automatically block an initiation to an interaction session associated with the at least one digital signal in response to a failure by the particular user to complete the at least one generated authentication step. In some embodiments, the exemplary dynamic authentication generator module 118 may transmit a request for at least one unique identifier associated with the particular user via at least one graphical (GUI) having at least one GUI programmable element within the computing device 102. In some embodiments, the exemplary dynamic authentication generator module 118 may dynamically reduce the plurality of generated authentication steps in response to a positive match between the digital signal, the repository of telecommunication data, and a repository to compiled historical data as a baseline. In some embodiments, the exemplary dynamic authentication generator module 118 may utilizer a geo-location module 126 to actively detect risk by determining the location of the computing device 102. For example, the threshold of location risk may refer to a global rate limit associated with the repository of telecommunication data.

In some embodiments, the present disclosure describes systems for utilizing at least one machine learning algorithm of a plurality of machine learning algorithms within the machine learning module 120 that may identify at least one digital signal within the input data. In some embodiments, the machine learning module 120 may be trained by automatically updating the repository of telecommunication data based on received input data over a period of time. In some embodiments, the machine learning module 120 may automatically verify an identity of the at least one digital signal based on a comparison to a repository of telecommunication data associated with a particular interaction parameter of the input data. In some embodiments, the machine learning module 120 may utilize the initiation protocol-specific backbone engine 124 to determine that the at least one digital signal fails to match the comparison of the repository of telecommunication data associated with the particular interaction parameter. In some embodiments, the machine learning module 120 may automatically update the repository of telecommunication data associated with the particular interaction parameter with a failure to match associated with the at least one digital signal. In some embodiments, the machine learning module 120 may calculate at least one confidence score associated with at least one risk factor of a plurality of risk factors. In some embodiments, the machine learning module 120 may dynamically aggregate each confidence score to calculate an overall confidence score associated with the at least one digital signal. In some embodiments, the machine learning module 120 may dynamically generate at least one authentication step to be performed in addition to the plurality of authentication steps associated with a high-rest activity request. In other embodiments, the machine learning module 120 may generate the at least one authentication step for the at least one digital signal based on the overall confidence score meeting and/or meeting a predetermined threshold of risk. In some embodiments, the machine learning module 120 may automatically block an initiation to an interaction session associated with the at least one digital signal in response to a failure by the particular user to complete the at least one generated authentication step.

In some embodiments, the data output module 122 may determine that the at least one digital signal fails to match a comparison of at least one data point within the repository of telecommunication data associated with a particular interaction parameter. In some embodiments, the data output module 122 may automatically update the repository of telecommunication data associated with the particular interaction parameter in response to the determination of the data signal failing to match with the at least one data point within the repository of telecommunication data associated with the particular interaction parameter. In some embodiments, the data output module 122 may calculate at least one confidence score associated with at least one risk factor of a plurality of risk factors. In some embodiments, the data output module 122 may aggregate each confidence score to calculate an overall confidence score associated with the at least one digital signal. In some embodiments, the data output module 122 may dynamically generate at least one authentication step to be performed by the particular user requesting a high-risk activity associated with the at least one digital signal based on the overall confidence score meeting and/or exceeding the predetermined threshold of risk. In some embodiments, the data output module 122 may automatically block the initiation to the interaction session associated with the at least one digital signal in response to the failure by the particular user to complete the at least one generated authentication step. In some embodiments, the data output module 122 may transmit a request for at least one unique identifier associated with the particular user via at least one GUI having at least one GUI programmable element within the computing device 102. In some embodiments, the data output module 122 may dynamically reduce the plurality of generated authentication steps in response to a positive match between the digital signal, the repository of telecommunication data, and a repository of compiled historical telecommunication data. In some embodiments, the data output module 122 may determine the location of the computing device 102 associated with the digital signal based on a threshold of location risk, where the threshold of location risk is based on a global rate limit associated with the repository of telecommunication data.

In some embodiments, the illustrative program engine 104 may receive input data from at least two external data sources of a plurality of external data sources. In some embodiments, the illustrative program engine 104 may utilized a trained machine learning module 120 to identify at least one digital signal within the input data. In some embodiments, the illustrative program engine 104 may automatically verify an identity of the at least one digital signal based on a comparison to a plurality of data points within a repository of telecommunication data associated with a particular interaction parameter of the input data. In some embodiments, the illustrative program engine 104 may utilize an initiation protocol-specific backbone engine 124 to determine that the at least one digital signal fails to match the comparison of the repository of telecommunication data associated with the particular interaction parameter. In some embodiments, the illustrative program engine 104 may automatically update the repository of telecommunication data associated with the particular interaction parameter with a failure to match a comparison of at least one data point of the plurality of data points associated with the at least one digital signal. In some embodiments, the illustrative program engine 104 may utilize the trained machine learning module 120 to calculate at least one confidence score associated with at least one risk factor of a plurality of risk factors. In some embodiments, the illustrative program engine 104 may dynamically aggregate each confidence score to calculate an overall confidence score associated with the at least one digital signal. In some embodiments, the illustrative program engine 104 may dynamically generate at least one authentication step to be performed by the particular user requesting a high-risk activity associated with the at least one digital signal based on the overall confidence score meeting and/or exceeding the predetermined threshold of risk. In some embodiments, the illustrative program engine 104 may automatically block the initiation to the interaction session associated with the at least one digital signal in response to a failure by the particular user to complete the at least one generated authentication step. In some embodiments, the illustrative program engine 104 may transmit a request for at least one unique identifier associated with the particular user via the at least one GUI having the at least one GUI programmable element within the computing device 102. In some embodiments, the illustrative program engine 104 may utilize a geo-location module 126 to actively detect risk by determining the location of the computing device 102 associated with the digital signal based on a threshold of location risk.

In some embodiments, the non-transient memory 110 may store the identity of the at least one digital signal based on a comparison to a plurality of data points within a repository of telecommunication data associated with a particular interaction parameter of the input data. In some embodiments, the non-transient memory 110 may store a plurality of matches based on comparisons between the at least one digital signal, the particular interaction parameter of the input data, and the repository of telecommunication data. In some embodiments, the non-transient memory 110 may store the plurality of risk factors associated with the calculated confidence score. In some embodiments, the non-transient memory 110 may store an aggregation of each calculated confidence score as an overall confidence score. In some embodiments, the non-transient memory 110 may store the plurality of generated authentication step to be performed by the particular user to perform a requested a high-risk activity.

Figure 2:
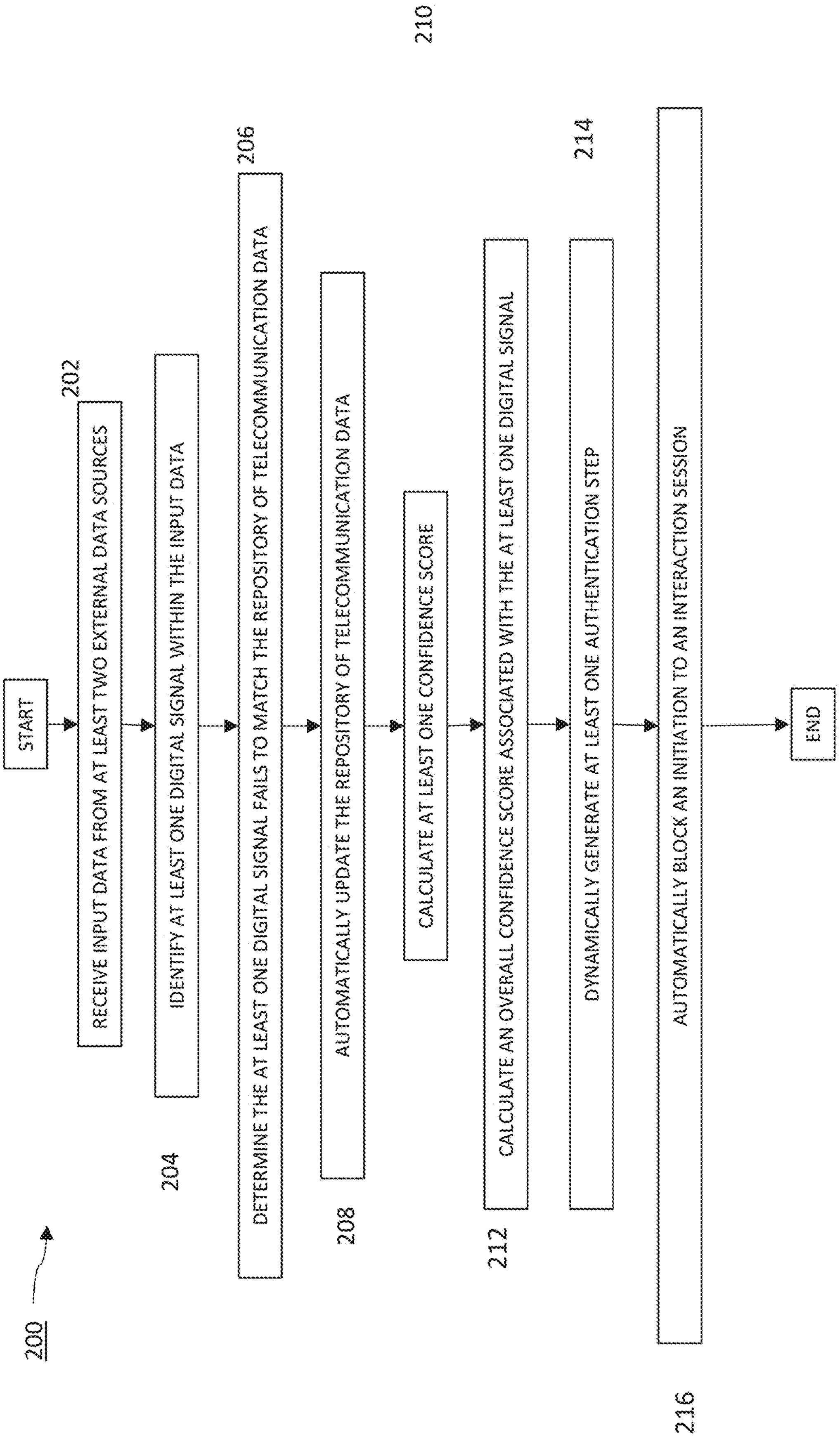
FIG. 2 is a flowchart illustrating operational steps for dynamically generating at least one authentication step to be performed by the particular user requesting a high-risk activity associated with the at least one digital signal, in accordance with one or more embodiments of the present disclosure.

FIG. 2 is a flowchart 200 illustrating operational steps for dynamically generating at least one authentication step to be performed by the particular user requesting a high-risk activity associated with the at least one digital signal, in accordance with one or more embodiments of the present disclosure.

In step 202, the illustrative program engine 104 within the computing device 102 may be programmed to receive input data from at least two external data sources. In some embodiments, the illustrative program engine 104 may receive the input data from at least two server computing devices 106 of a plurality of server computing devices 106. In some embodiments, the input data may refer to telecommunication data associated with a particular computing device 102. In some embodiments, the server computing device 106 may refer to a server computer associated with a telecommunication entity that registers and stores telecommunication data for each computing device 102 associated with the telecommunication entity. In some embodiments, the computing device 102 may refer to a smart phone, mobile phone, laptop, and/or any computing device capable of perform a plurality of calling-related activities. For example, the plurality of calling-related activities may refer to interaction sessions, conference calls, facetimes, phone call, and/or email transmissions. In other embodiments, the exemplary dynamic authentication generator module 118 may receive the input data from at least two server computing devices 106 of a plurality of server computing devices 106. In some embodiments, the server computing device 106 may refer to at least one mobile network operator in a plurality of mobile network operators.

In step 204, the illustrative program engine 104 may identify at least one digital signal within the input data. In some embodiments, the illustrative program engine 104 may utilize the machine learning module 120 to identify the at least one digital signal in a plurality of digital signals within the input data. In some embodiments, the at least one digital signal may refer to a particular interaction session and/or calling-related activity associated with the computing device 102 at a particular time. For example, the at least one digital signal may refer to a particular interaction parameter associated with a particular user, which may be a phone number, email address, or IP address associated with the computing device 102 of the particular user. In some embodiments, the exemplary dynamic authentication generator module 118 may automatically verify an identity of the at least one digital signal based on a comparison of a plurality of data points within a repository of telecommunication data and a particular interaction parameter of the input data.

In step 206, the illustrative program engine 104 may determine the at least one digital signal fails to match the repository of telecommunication data. In some embodiments, the illustrative program engine 104 may determine the at least one digital signal fails to match the comparison between the plurality of data points within the repository of telecommunication data and the particular interaction parameter of the input data. In some embodiments, the repository of telecommunication data may refer to a generation of compiled information from a plurality of server computing devices 106. In some embodiments, the illustrative program engine 104 may utilize an initiation protocol-specific backbone module 124 to determine that the at least one digital signal fails to match the comparison of the plurality of data points within the repository of telecommunication data and the particular interaction parameter of the input data. In some embodiments, the initiation protocol-specific backbone module 124 may refer to at least one machine learning module that may analyze the at least one digital signal, dynamically rank at least one comparison of a plurality of comparisons associated with the analyzed digital signal, and automatically select at least one comparison that maintains a particular rank of the plurality of comparison based on a plurality of risk factors. In some embodiments, the exemplary dynamic authentication generator module 118 may utilize the initiation protocol-specific backbone module 124 to determine that the at least one digital signal fails to match the comparison of the plurality of data points within the repository of telecommunication data and the particular interaction parameter of the input data.

In step 208, the illustrative program engine 104 may automatically update the repository of telecommunication data. In some embodiments, the illustrative program engine 104 may automatically update the repository of telecommunication data associated with the particular interaction parameter with a failure to match at least one comparison associated with the at least one digital signal. In some embodiments, the failure to match the at least one comparison may refer to an analysis of the at least one digital signal with the plurality of data points of the repository of telecommunication data, where the digital signal does not maintain any similarities with at least one data point of the repository of telecommunication data. In some embodiments, the automatic update of the repository of telecommunication data may refer to a modification to the telecommunication data in response to the failure of a match between the particular interaction parameter and the plurality of data points within the repository of telecommunication data. In some embodiments, the exemplary dynamic authentication generator module 118 may automatically update the repository of telecommunication data associated with the particular interaction parameter with a failure to match at least one comparison associated with the at least one digital signal.

In step 210, the illustrative program engine 104 may calculate at least one confidence score. In some embodiments, the illustrative program engine 104 may calculate the at least one confidence score associated with at least one risk factor of a plurality of risk factors. In some embodiments, the at least one risk factor may refer to a security parameter associated with the mobile network operator. For example, a risk factor associated with the mobile network operator may refer to a known suspicious interaction parameter associated with the at least one digital signal. In another example, the risk factor associated with the mobile network operator may refer to a frequency of outgoing interaction session during a particular period of time associated with the at least one digital signal. In some embodiments, the illustrative program engine 104 may utilize the trained machine learning module 120 to calculate the at least one confidence score associated with at least one risk factor of a plurality of risk factors by assessing a value to each risk factor of the plurality of risk factors and summing the assessed values of each risk factor of the plurality of risk factors determined to be present with the at least one digital signal. In some embodiments, the exemplary dynamic authentication generator module 118 may utilize the trained machine learning module 120 to calculate the at least one confidence score associated with at least one risk factor of a plurality of risk factors.

In step 212, the illustrative program engine 104 may calculate an overall confidence score associated with at least one digital signal. In some embodiments, the illustrative program engine 104 may dynamically aggregate each confidence score associated with the plurality of risk factors to calculate the overall confidence score associated with the at least one digital signal. In some embodiments, the overall confidence score may refer to at least two confidence scores, where each confidence score is associated with a plurality of risk factors based on each mobile network operator. In some embodiments, the exemplary dynamic authentication generator module 118 may dynamically aggregate each confidence score associated with the plurality of risk factors to calculate the overall confidence score associated with the at least one digital signal.

In step 214, the illustrative program engine 104 may dynamically generate at least one authentication step. In some embodiments, the illustrative program engine 104 may dynamically generate the at least one authentication step to be performed by the particular user. In some embodiments, the illustrative program engine 104 may dynamically generate the at least one authentication step to be performed by the particular user requesting a high-risk activity associated with the at least one digital signal based on the overall confidence score meeting and/or exceeding a predetermined threshold of risk. In some embodiments, the high-risk activity may refer to an activity that exceeds a baseline of risk, where the baseline may refer to the predetermined threshold of risk. In some embodiments, the predetermined threshold of risk may refer to a calculated risk value associated with the overall confidence score, where once met the risk associated with the activity requires additional verification to execute the requested action. For example, the illustrative program engine 104 may dynamically request a user to answer a predetermined security question in response to an attempt to initiate an interaction session with a known suspicious digital signal. In some embodiments, the exemplary dynamic authentication generator module 118 may dynamically generate the at least one authentication step to be performed by the particular user requesting a high-risk activity associated with the at least one digital signal based on the overall confidence score meeting and/or exceeding a predetermined threshold of risk.

In step 216, the illustrative program engine 104 may automatically block an initiation to an interaction session. In some embodiments, the illustrative program engine 104 may automatically block the initiation to the interaction session associated with the at least one digital signal in response to a failure by the particular user to complete the at least one generated authentication step. In some embodiments, the interaction session may refer to an incoming phone call, a conference call, a facetime, and/or email notification. In some embodiments, the failure to complete the authentication step may refer to a refusal of the particular user to complete the at least one generated authentication step within an allotted time period. In other embodiments, the failure to complete the authentication step may refer to incorrect information received by the computing device 102 associated with the at least one generated authentication step. In some embodiments, the automatic blocking of the initiation to the interaction session may increase security parameters of the computing device 102 by preventing the particular user to perform the high-risk activity. In some embodiments, the exemplary dynamic authentication generator module 118 may automatically block the initiation to the interaction session associated with the at least one digital signal in response to a failure by the particular user to complete the at least one generated authentication step.

In some embodiments, the illustrative program engine 104 may transmit a request for at least one unique identifier associated with the particular user via the at least one GUI having the at least one GUI programmable element within the computing device 102. In some embodiments, the at least one unique identifier may refer to login and password information, biometric information associated with the particular user, account information associated with the particular user, and/or a plurality of preferences associated with the particular user. In some embodiments, the exemplary dynamic authentication generator module 118 may transmit a request for at least one unique identifier associated with the particular user via the at least one GUI having the at least one GUI programmable element within the computing device 102. In some embodiments, the illustrative program engine 104 may utilize a geo-location module 126 to actively detect risk by determining the location of the computing device 102 associated with the digital signal based on a threshold of location risk. In some embodiments, the geo-location module 126 may utilize a plurality of sensors to locate the computing device 102 associated with a global positioning system algorithm to determine a global rate limit associated with the digital signal. In some embodiments, the determined global rate limit may refer to a baseline threshold of risk associated with a determined location of the computing device 102 initiating the interaction session using the plurality of sensors and an analysis of the telecommunication data from the mobile operation network.

Figure 3:
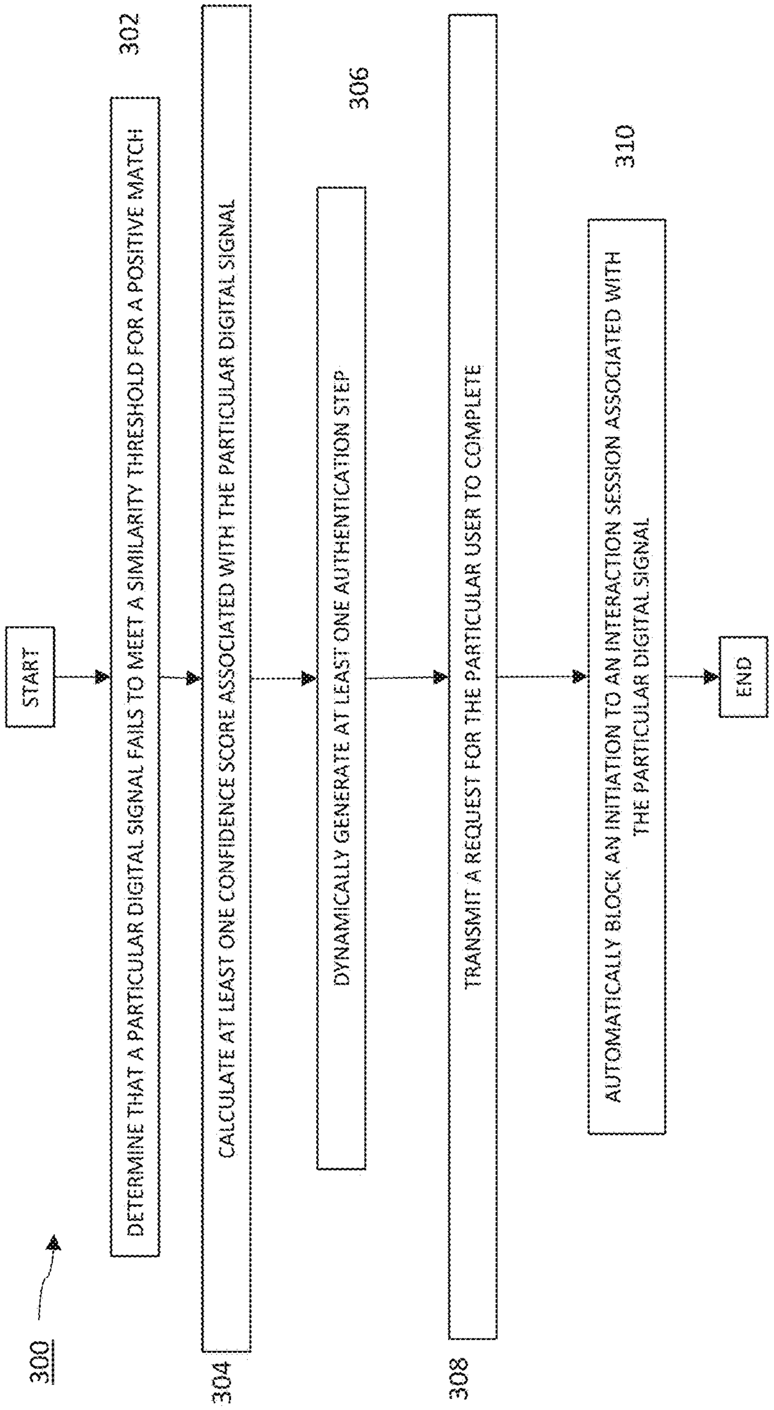
FIG. 3 is a flowchart illustrating operational steps of automatically blocking an initiation to an interaction session between at least two computing devices, in accordance with one or more embodiments of the present disclosure.

FIG. 3 is a flowchart 300 illustrating operations steps for automatically blocking an initiation to an interaction session between at least two computing devices, in accordance with one or more embodiments of the present disclosure.

In step 302, the illustrative program engine 104 may determine that a particular digital signal fails to meet a similarity threshold for a positive match. In some embodiments, the illustrative program engine 104 may determine that the particular digital signal fails to meet the similarity threshold for a positive match between a plurality of data points within a repository of telecommunication data. In some embodiments, the similarity threshold may refer to the baseline of similarity data between a plurality of risk factors and identified metadata between the particular digital signal and the plurality of data points within the repository of telecommunication data. For example, the data points within the repository of telecommunication data may refer to a plurality of phone numbers, email addresses, IP address and/or account information identified and stored by the mobile network operator. In some embodiments, the illustrative program engine 104 may utilize the initiation protocol-specific backbone engine 124 to determine that the particular digital signal fails to meet the similarity threshold for the positive match between the plurality of data points within the repository of telecommunication data. In some embodiments, the exemplary dynamic authentication generator module 118 may determine that the particular digital signal fails to meet the similarity threshold for the positive match between the plurality of data points within a repository of telecommunication data. In some embodiments, the similarity threshold is a predetermined range of similarities between each data point of the plurality of data points and the particular digital signal to be deemed as a match.

In step 304, the illustrative program engine 104 may calculate at least one confidence score associated with the particular digital signal. In some embodiments, the illustrative program engine 104 may calculate the at least one confidence score of a plurality of confidence scores associated with the particular digital signal based on the failure to match the plurality of data points within the repository of telecommunication data. In some embodiments, the at least one confidence score may refer to a summation of assessed values for a plurality of risk factors associated with the particular digital signal. In some embodiments, the summation of assessed values for the plurality of risk factors may require a summation of only risk factors presently associated with the particular digital signal. In some embodiments, illustrative program engine 104 may utilize the trained machine learning algorithm 120 to calculate the at least one confidence score of a plurality of confidence scores associated with the particular digital signal based on the failure to match the plurality of data points within the repository of telecommunication data. In some embodiments, the exemplary dynamic authentication generator module 118 may the at least one confidence score may refer to a summation of assessed values for a plurality of risk factors associated with the particular digital signal.

In step 306, the illustrative program engine 104 may dynamically generate at least one authentication step. In some embodiments, the illustrative program engine 104 may dynamically generate the at least one authentication step to be performed by the particular user. In some embodiments, the illustrative program engine 104 may dynamically generate the at least one authentication step to be performed by the particular user based on a request for an execution of at least one activity associated with the particular digital signal. In some embodiments, the at least one activity may refer to a high-risk activity based on the overall confidence score meeting and/or exceeding the predetermined threshold of risk. In some embodiments, the exemplary dynamic authentication generator module 118 may dynamically generate the at least one authentication step to be performed by the particular user based on a request for an execution of at least one activity associated with the particular digital signal.

In step 308, the illustrative program engine 104 may transmit a request for the particular user to complete. In some embodiments, the illustrative program engine 104 may transmit the request for the particular user to complete the generated authentication step via at least one GUI having at least one programmable GUI element within the computing device 102. In some embodiments, the request may refer to the particular user providing a unique identifier associated with the particular user. For example, the illustrative program engine 104 may transmit a security question that must be answered within an allotted time period via the GUI within the computing device 102. In some embodiments, the exemplary dynamic authentication generator module 118 may transmit the request for the particular user to complete the generated authentication step via at least one GUI having at least one programmable GUI element within the computing device 102.

In step 310, the illustrative program engine 104 may automatically block an initiation to an interaction session associated with the particular signal. In some embodiments, the illustrative program engine 104 may automatically block the initiation of the interaction session associated with the particular digital signal. In some embodiments, the illustrative program engine 104 may automatically block the initiation of the interaction session associated with the particular digital signal in response to the particular user failing to complete the generated authentication step. In some embodiments, the failure to complete the generated authentication step may refer to the particular user inputting incorrect information or not adequately providing the necessary information before an expiration of the allotted time. In some embodiments, the exemplary dynamic authentication generator module 118 may automatically block the initiation of the interaction session associated with the particular digital signal in response to the particular user failing to complete the generated authentication step.

Figure 4:
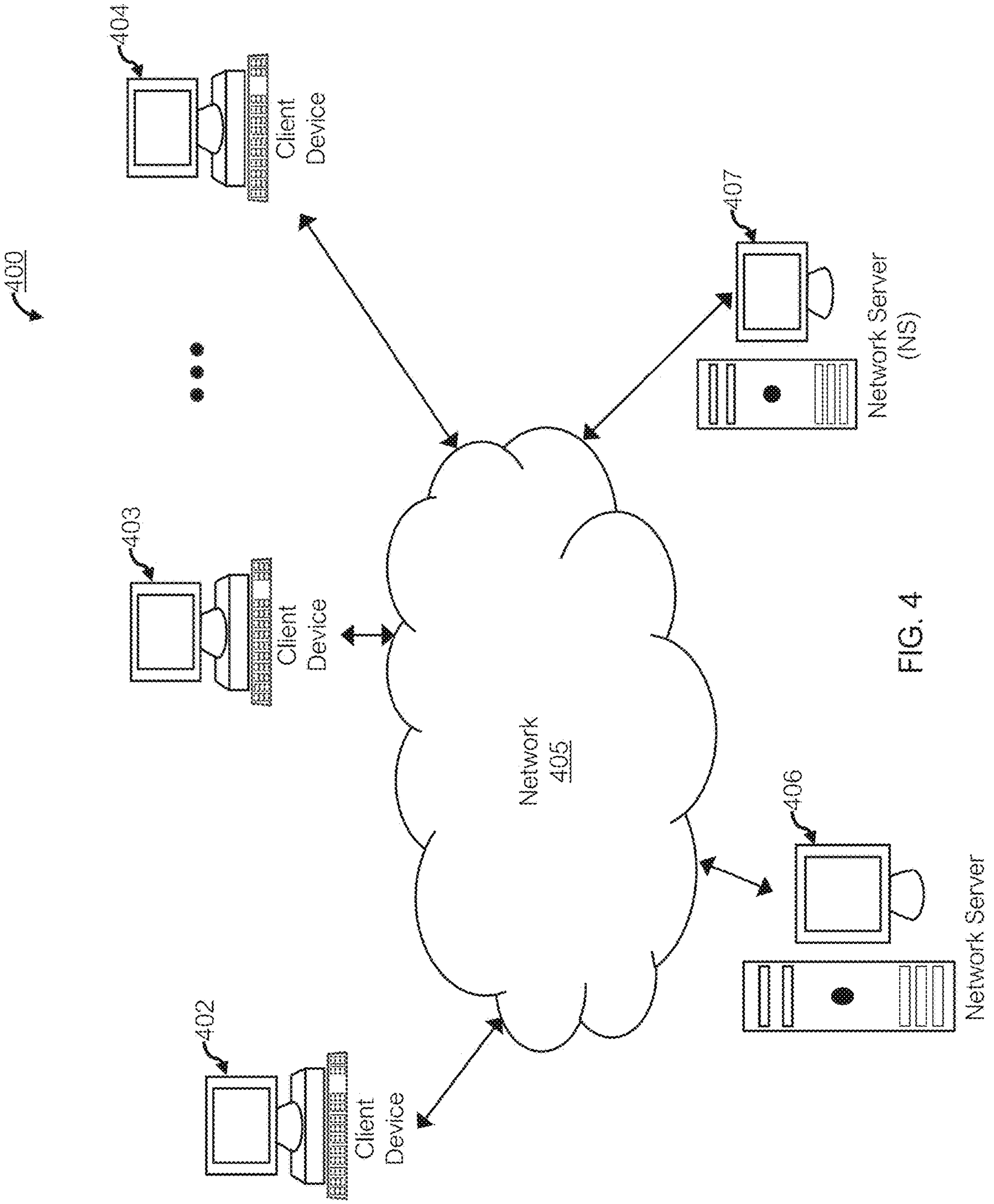
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to dynamically determine the presence of a digital fingerprint associated with a computing device 102 and dynamically reduce a plurality of subsequent authentication steps associated with an activity in response to generating at least one authentication step associated with a particular digital signal, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary dynamic authentication generator module 118 of the present disclosure, utilizing at least one machine-learning model described herein.

In some embodiments, referring to FIG. 4, members 402-404 (e.g., clients) of the exemplary computer-based system/platform 400 may include virtually any computing device capable of automatically updating, dynamically removing, and automatically restoring a plurality of data records within a generated database of known queries via a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary dynamic authentication generator module 118 of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to calculate an overall confidence value and modify the plurality of subsequent authentication steps to execute a computing device 102 based on the determination of positive match between the digital signal and the repository of telecommunication data.

Figure 5:
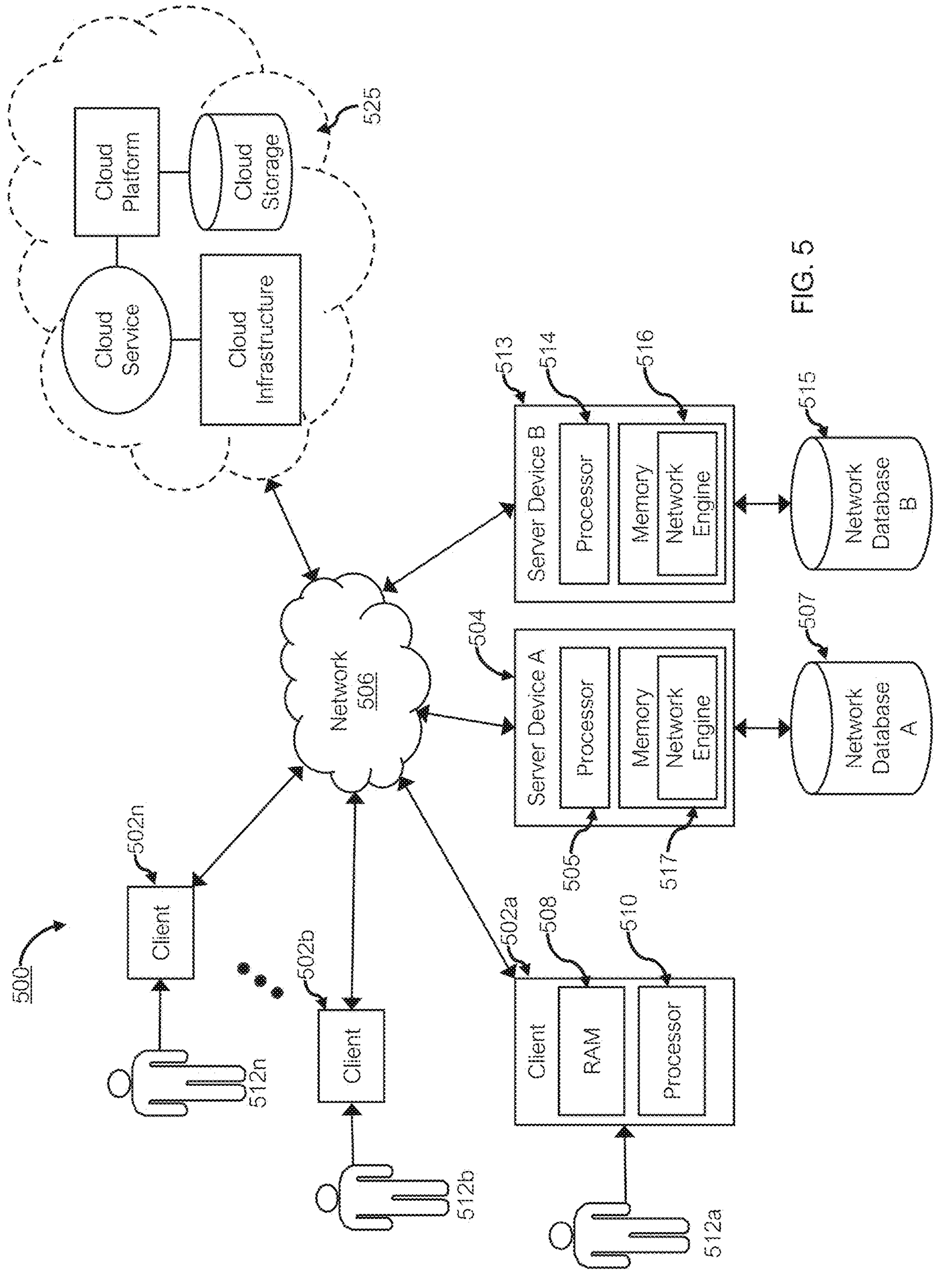
FIG. 5 depicts a block diagram of another exemplary computer-based system/platform in accordance with one or more embodiments of the present disclosure

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502*a*, 502*b* thru 502*n* shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502*a* through 502*n* may also comprise a number of external or internal devices such as a mouse, a CD-ROM, DVD, a physical or virtual keyboard, a display, a speaker, or other input or output devices. In some embodiments, examples of member computing devices 502*a* through 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502*a* through 502*n* may be specifically programmed with one or more application programs in accordance with one or more principles/methodologies detailed herein. In some embodiments, member computing devices 502*a* through 502*n* may operate on any operating system capable of supporting a browser or browser-enabled application, such as Microsoft™, Windows™, and/or Linux. In some embodiments, member computing devices 502*a* through 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* through 502*n*, users, 512*a* through 512*n*, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502*a* through 502*n* may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
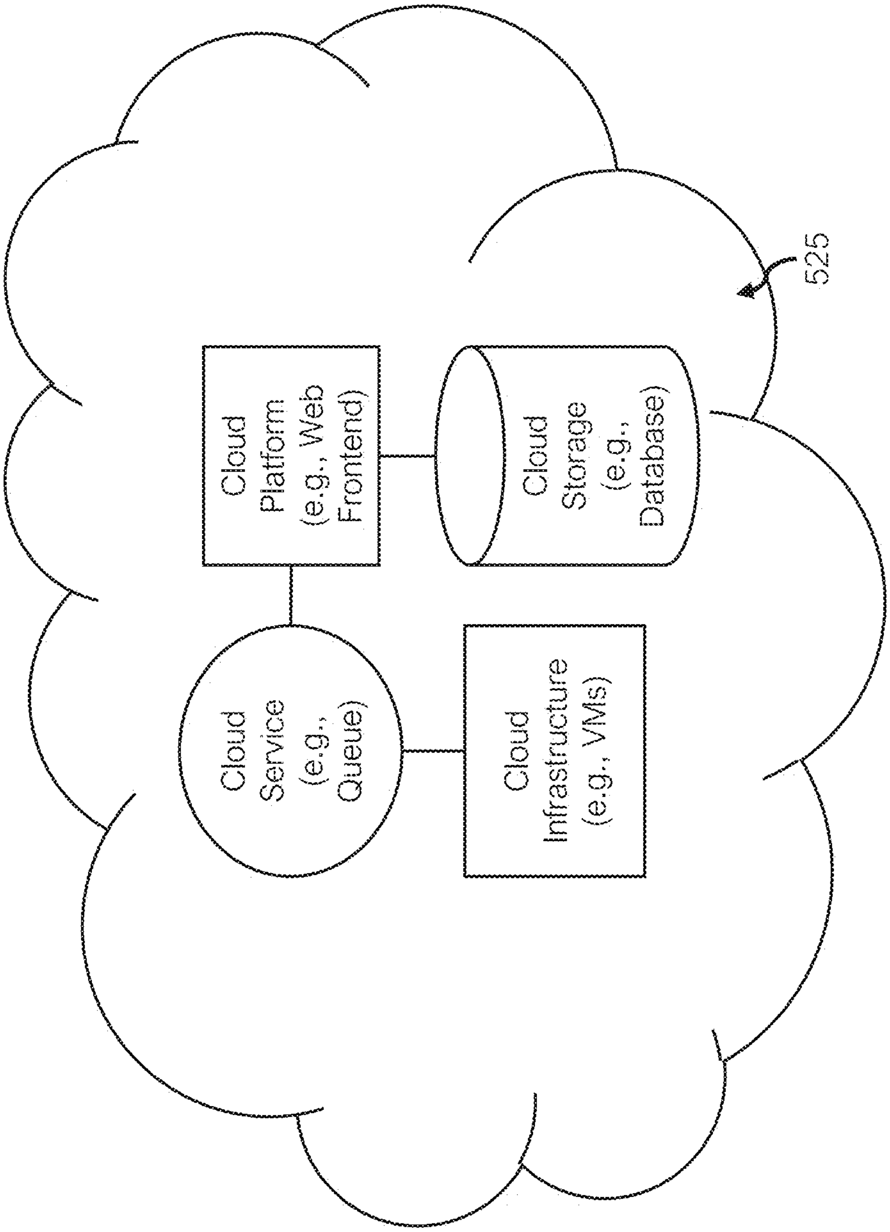
FIGS. 6 and 7 are diagrams illustrating implementations of cloud computing architecture/aspects with respect to which the disclosed technology may be specifically configured to operate, in accordance with one or more embodiments of the present disclosure.
Figure 7:
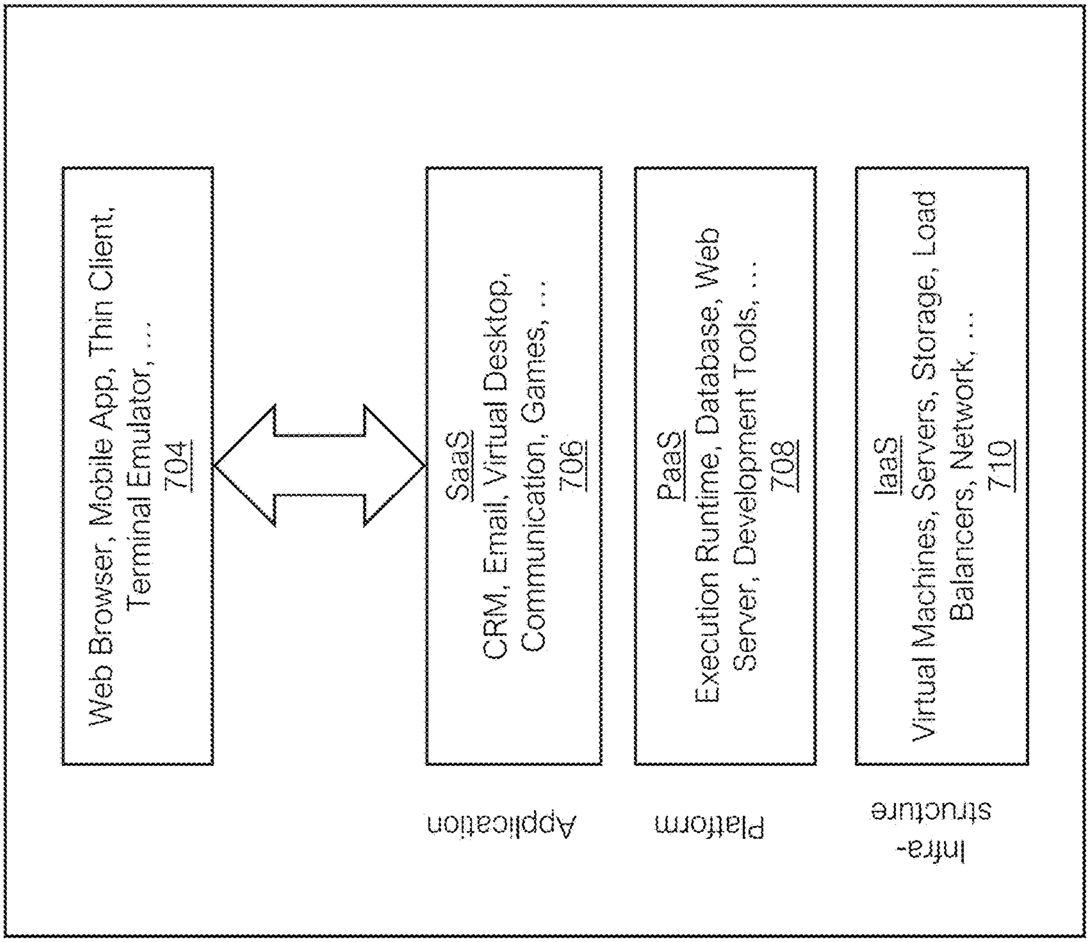

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS) 710, platform as a service (PaaS) 708, and/or software as a service (SaaS) 706.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores"

may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

At least some aspects of the present disclosure will now be described with reference to the following numbered clauses.

Clause 1. A method may include: receiving, by the at least one processor, input data from at least two external data sources of a plurality of external data sources; utilizing, by the at least one processor, a trained machine learning algorithm to identify at least one digital signal within the input data; automatically verifying, by the at least one processor, the identity of the at least one digital signal based on a comparison to a repository of telecommunication data associated with the particular interaction parameter; utilizing, by the at least one processor, an initiation protocol-specific backbone engine to determine that the at least one digital signal fails to match the comparison of the repository of telecommunication data associated with the particular interaction parameter; automatically updating, by the at least one processor, the repository of telecommunication data associated with the particular interaction parameter with a failure to match associated with the at least one digital signal; utilizing, by the at least one processor, the trained machine learning algorithm to calculate at least one confidence score associated with at least one factor of risk of a plurality of factors of risk; dynamically aggregating, by the at least one processor, each confidence score to calculate an overall confidence score associated with the at least one digital signal; dynamically generating, by the at least one processor, at least one authentication step to be performed by the particular user requesting a high-risk activity associated with the at least one digital signal based on the overall confidence score meeting or exceeding a predetermined threshold of risk; and automatically blocking, by the at least one processor, an initiation to an interaction session associated with the at least one digital signal in response to a failure by the particular user to complete the at least one authentication step.

Clause 2. The method according to clause 1, where the external data source is a mobile network operator.

Clause 3. The method according to clause 1 or 2, where the at least one data signal is associated with a particular interaction parameter associated with the particular user.

Clause 4. The method according to clause 1, 2 or 3, where the repository of telecommunication data is generated by a plurality of data servers compiling information.

Clause 5. The method according to clause 1, 2, 3 or 4, where the at least one factor of risk is associated with the at least one external data source.

Clause 6. The method according to clause 1, 2, 3, 4 or 5, where the automatically blocking the initiation to the interaction session includes preventing any communication between at least two computing devices, wherein at least one computing device is associated with the at least one digital signal to the mobile device.

Clause 7. The method according to clause 1, 2, 3, 4, 5 or 6, further including transmitting, by the at least one processor, via at least one graphical user interface (GUI) having at least one GUI programmable element within a computing device a request for at least one unique identifier associated with the particular user.

Clause 8. The method according to clause 1, 2, 3, 4, 5, 6 or 7, where the request for the at least one unique identifier is at least one authentication step.

Clause 9. The method according to clause 1, 2, 3, 4, 5, 6, 7 or 8, further including dynamically reducing the plurality of generated authentication steps in response to a positive match between the digital signal, the repository of telecommunication data, and a repository of compiled historical telecommunication data.

Clause 10. The method according to clause 1, 2, 3, 4, 5, 6, 7, 8 or 9, further including utilizing a geo-location algorithm to actively detect risk by determining the location of the mobile device associated with the digital signal based on a threshold of location risk, where the threshold of location risk is based on a global rate limit associated with the repository of telecommunication data.

Clause 11. A method may include: obtaining, by at least one processor, a permission from a particular user to monitor a plurality of activities executed within a mobile device; continually monitoring, by the at least one processor, the plurality of activities executed within the mobile device for a predetermined period of time; receiving, by the at least one processor, input data from at least two external data sources of a plurality of external data sources; utilizing, by the at least one processor, a trained machine learning algorithm to identify at least one data signal within the input data; automatically verifying, by the at least one processor, the identity of the at least one digital signal based on a comparison to a repository of telecommunication data associated with the particular interaction parameter; utilizing, by the at least one processor, an initiation protocol-specific backbone engine to determine that the at least one digital signal fails to match the comparison of the repository of telecommunication data associated with the particular interaction parameter; automatically updating, by the at least one processor, the repository of telecommunication data associated with the particular interaction parameter with a failure to match associated with the at least one digital signal; utilizing, by the at least one processor, the trained machine learning algorithm to calculate at least one confidence score associated with at least one factor of risk of a plurality of factors of risk, wherein the at least one factor of risk is associated with the at least one external data source; dynamically aggregating, by the at least one processor, each confidence score to calculate an overall confidence score associated with the at least one digital signal; dynamically generating, by the at least one processor, at least one authentication step to be performed by the particular user requesting a high-risk activity associated with the at least one digital signal based on the overall confidence score meeting or exceeding a predetermined threshold of risk; automatically blocking, by the at least one processor, an initiation to an interaction session associated with the at least one digital signal in response to a failure by the particular user to complete the at least one authentication step; and transmitting, by the at least one processor, via at least one graphical user interface (GUI) having at least one GUI programmable element within a computing device a request for at least one unique identifier associated with the particular user, wherein the request for the at least one unique identifier is at least one authentication step.

Clause 12. The method according to clause 11, where the external data source is a mobile network operator.

Clause 13. The method according to clause 11 or 12, where the at least one data signal is associated with a particular interaction parameter associated with the particular user.

Clause 14. The method according to clause 11, 12 or 13, where the repository of telecommunication data is generated by a plurality of data servers compiling information.

Clause 15. The method according to clause 11, 12, 13 or 14, where the at least one factor of risk is associated with the at least one external data source.

Clause 16. The method according to clause 11, 12, 13, 14 or 15, where the automatically blocking the initiation to the interaction session comprises preventing any communication between at least two computing devices, wherein at least one computing device is associated with the at least one digital signal to the mobile device.

Clause 17. The method according to clause 11, 12, 13, 14, 15 or 16, further including dynamically reducing the plurality of generated authentication steps in response to a positive match between the digital signal, the repository of telecommunication data, and a repository of compiled historical telecommunication data.

Clause 18. The method according to clause 11, 12, 13, 14, 15, 16 or 17, further including utilizing a geo-location algorithm to actively detect risk by determining the location of the mobile device associated with the digital signal based on a threshold of risk, where the threshold of risk is based on a global rate limit associated with the repository of telecommunication data.

Clause 19. A system may include: a non-transient computer memory, storing software instructions; and at least one processor of a first computing device associated with a user; where, when the at least one processor executes the software instructions, the first computing device is programmed to: receive, by the at least one processor, input data from at least two external data sources of a plurality of external data sources; utilize, by the at least one processor, a trained machine learning algorithm to identify at least one digital signal within the input data; automatically verify, by the at least one processor, the identity of the at least one digital signal based on a comparison to a repository of telecommunication data associated with the particular interaction parameter; utilize, by the at least one processor, an initiation protocol-specific backbone engine to determine that the at least one digital signal fails to match the comparison of the repository of telecommunication data associated with the particular interaction parameter; automatically update, by the at least one processor, the repository of telecommunication data associated with the particular interaction parameter with a failure to match associated with the at least one digital signal; utilize, by the at least one processor, the trained machine learning algorithm to calculate at least one confidence score associated with at least one factor of risk of a plurality of factors of risk; dynamically aggregate, by the at least one processor, each confidence score to calculate an overall confidence score associated with the at least one digital signal; dynamically generate, by the at least one processor, at least one authentication step to be performed by the particular user requesting a high-risk activity associated with the at least one digital signal based on the overall confidence score meeting or exceeding a predetermined threshold of risk; and automatically block, by the at least one processor, an initiation to an interaction session associated with the at least one digital signal in response to a failure by the particular user to complete the at least one authentication step.

Clause 20. The system according to clause 19, where the software instructions further include utilizing a geo-location algorithm to actively detect risk by determining the location of the mobile device associated with the digital signal based on a threshold of risk, where the threshold of risk is based on a global rate limit associated with the repository of telecommunication data.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method comprising:

obtaining, by at least one processor, a permission from a particular user to monitor a plurality of activities executed within a device;

continually monitoring, by the at least one processor, the plurality of activities executed within the device for a predetermined period of time;

receiving, by the at least one processor, input data from at least two external data sources associated with the plurality of activities executed within the device;

utilizing, by the at least one processor, a trained machine learning algorithm to identify at least one digital signal within the input data, wherein the at least one data signal is associated with a particular interaction parameter associated with the particular user;

utilizing, by the at least one processor, an initiation protocol-specific backbone engine to determine that the at least one digital signal fails to match a repository of telecommunication data associated with the particular interaction parameter;

automatically updating, by the at least one processor, the repository of telecommunication data with a failure to match associated with the at least one digital signal;

utilizing, by the at least one processor, the trained machine learning algorithm to calculate a confidence score for each factor of risk of a plurality of factors of risk associated with the at least one digital signal;

aggregating, by the at least one processor, the confidence score for each factor of risk of the plurality of factors of risk to calculate an overall confidence score;

generating, by the at least one processor, at least one authentication step to be performed by the particular user requesting a high-risk activity associated with the at least one digital signal based on the overall confidence score meeting or exceeding a predetermined threshold of risk; and automatically blocking, by the at least one processor, an initiation to an interaction session associated with the at least one digital signal in response to a failure by the particular user to complete the at least one authentication step.

2. The computer-implemented method of claim 1, wherein at least one of the at least two external data sources is a mobile network operator.

3. The computer-implemented method of claim 1, wherein the repository of telecommunication data is generated by a plurality of data servers compiling information.

4. The computer-implemented method of claim 1, wherein the plurality of factors of risk is associated with at least one of the at least two external data sources.

5. The computer-implemented method of claim 1, wherein the automatically blocking the initiation to the interaction session comprises preventing any communication between at least two computing devices, wherein at least one of the at least two computing devices is associated with the at least one digital signal to a mobile device.

6. The computer-implemented method of claim 1, further comprising transmitting, by the at least one processor, via at least one graphical user interface (GUI) having at least one GUI programmable element within a computing device a request for at least one unique identifier associated with the particular user.

7. The computer-implemented method of claim 6, wherein the request for the at least one unique identifier is at least one authentication step.

8. The computer-implemented method of claim 1, further comprising dynamically reducing at least one authentication step in response to a positive match between the at least one digital signal, the repository of telecommunication data, and a repository of compiled historical telecommunication data.

9. The computer-implemented method of claim 1, further comprising utilizing a geo-location algorithm to actively detect risk by determining a location of a mobile device associated with the at least one digital signal based on a threshold of risk, wherein the threshold of risk is based on a global rate limit associated with the repository of telecommunication data.

10. A system, comprising:

a non-transient computer memory, storing software instructions; and at least one processor of a first computing device;

wherein, when the at least one processor executes the software instructions, the first computing device is programmed to:

obtain, by the at least one processor, a permission from a particular user to monitor a plurality of activities executed within a device;

continually monitor, by the at least one processor, the plurality of activities executed within the device for a predetermined period of time;

receive, by the at least one processor, input data from at least two external data sources associated with the plurality of activities executed within the device;

utilize, by the at least one processor, a trained machine learning algorithm to identify at least one data signal within the input data, wherein the at least one data signal is associated with a particular interaction parameter associated with a particular user;

utilize, by the at least one processor, an initiation protocol-specific backbone engine to determine that the at least one data signal fails to match a repository of telecommunication data associated with the particular interaction parameter;

automatically update, by the at least one processor, the repository of telecommunication data with a failure to match associated with the at least one digital signal;

utilize, by the at least one processor, the trained machine learning algorithm to calculate at a confidence score for each factor of risk of a plurality of factors of risk associated with the at least one digital signal;

aggregate, by the at least one processor, the confidence score for each factor of risk of the plurality of factors of risk to calculate an overall confidence score;

generate, by the at least one processor, at least one authentication step to be performed by the particular user requesting a high-risk activity associated with the at least one digital signal based on the overall confidence score meeting or exceeding a predetermined threshold of risk; and automatically block, by the at least one processor, an initiation to an interaction session associated with the at least one digital signal in response to a failure by the particular user to complete the at least one authentication step.

11. The system of claim 10, wherein the first computing device is further programmed to utilize a geo-location algorithm to actively detect risk by determining a location of a mobile device associated with the at least one digital signal based on a threshold of risk, wherein the threshold of risk is based on a global rate limit associated with the repository of telecommunication data.

* * * * *